US011971968B2

(12) United States Patent
Tanisha et al.

(10) Patent No.: US 11,971,968 B2
(45) Date of Patent: Apr. 30, 2024

(54) ELECTRONIC COMMUNICATION SYSTEM AND METHOD USING BIOMETRIC EVENT INFORMATION

(71) Applicant: Mitel Networks Corporation, Kanata (CA)

(72) Inventors: Tantri Tanisha, Bangalore (IN); Logendra Naidoo, Ottawa (CA); Hanumanthu Susmitha, Hyderabad (IN)

(73) Assignee: Mitel Networks Corporation, Kanata (CA)

( * ) Notice: Subject to any disclaimer, the term of this patent is extended or adjusted under 35 U.S.C. 154(b) by 315 days.

(21) Appl. No.: 17/344,671

(22) Filed: Jun. 10, 2021

(65) Prior Publication Data

US 2022/0398303 A1  Dec. 15, 2022

(51) Int. Cl.
*G06F 21/32* (2013.01)
*G06F 9/54* (2006.01)
*G06F 21/44* (2013.01)
*G06F 21/45* (2013.01)
*G06F 21/62* (2013.01)

(52) U.S. Cl.
CPC .......... *G06F 21/32* (2013.01); *G06F 9/542* (2013.01); *G06F 21/44* (2013.01); *G06F 21/45* (2013.01); *G06F 21/6254* (2013.01); *G06F 2221/2141* (2013.01)

(58) Field of Classification Search
CPC .......... G06F 21/32; G06F 9/542; G06F 21/44; G06F 21/45; G06F 21/6254
See application file for complete search history.

(56) References Cited

U.S. PATENT DOCUMENTS

| 2011/0295392 | A1  | 12/2011 | Cunningham et al. |
| 2015/0026479 | A1* | 1/2015  | Yi ............................ G06F 21/32 713/182 |
| 2017/0060828 | A1  | 3/2017  | Rainisto |
| 2017/0262697 | A1* | 9/2017  | Kaps .................... G11B 27/022 |

OTHER PUBLICATIONS

Towards Data Science, "Bias in Natural Language Processing (NLP): A Dangerous But Fixable Problem"; retrieved from Internet on Nov. 10, 2022 at https://towarddatascience.com/.
Stack Overflow, "NPL—Extract the action verb, noun from a list of instructions", retrived from Internet on Nov. 15, 2022 at https//stackoverflow.com/questions.
Towards Data Science, "An Overview for Text Representations in NLP", retrieved from Internet on Nov. 15, 2022 at https://towardsdatascient.com/.
Towards Data Science, How to Rank Text Content by Semantic Similarity:, retrived from Internet on Nov. 15, 2022 at towardsdatascience.com.

(Continued)

*Primary Examiner* — Mishawn N. Hunter (57) ABSTRACT

Electronic communication methods and systems for determining biometric events and annotating recorded information with indicia of the biometric events are disclosed. Exemplary methods and systems can further determine contexts within the recorded information and further annotate the recorded information with indicia of the context.

20 Claims, 5 Drawing Sheets

(56) References Cited

OTHER PUBLICATIONS

Cambridge University Press © 2008, "Stemming and lemmatization", retrieved from Internet on Nov. 15, 2022 at https://nlp.standard.edu.

Machine Learning Plus, "Cosine Similarity—Understanding the math and how it works (with python codes)", retrieved from Internet on Nov. 15, 2022 at www.machinelearningplus.com.

Medium, "Text Similarities: Estimate the degree of similarity between two texts", retrieved from Internet on Nov. 15, 2022 at https://medium.com.

Standord Natural Language Processing Group, "Software (/software/) Stanford Parser", retrieved from internet on Nov. 15, 2022 at nlp.standord.edu.

* cited by examiner

ELECTRONIC COMMUNICATION SYSTEM AND METHOD USING BIOMETRIC EVENT INFORMATION

FIELD OF THE INVENTION

The present disclosure generally relates to electronic communication methods and systems. More particularly, examples of the disclosure relate to electronic communication methods and systems suitable for determining biometric events associated with a communication and annotating (e.g., with bookmarks and optionally other indicia) a recording of the electronic communication based on the biometric events.

BACKGROUND OF THE DISCLOSURE

Electronic communication methods and systems allow participants to communicate with one another, even when one or more participants are in remote locations. For example, phone calls and video calls, collaboration sessions, and the like, whether over a public switched telephone network (PSTN), a cellular network, and/or an internet protocol (IP) network, allow remotely located participants to communicate with one another. In some cases, two or more or all participants to an electronic communication can be at a same location and use their electronic devices to convey information.

During electronic communications, it may be desirable to record at least a portion of the communications. Such recordings can be made for a variety of reasons, such as preservation of records, learning, training, or the like. For example, a presenter may review a recording for opportunities to improve presentation skills, missing participants can review the recordings for content, participants can review to refresh memories, and the like.

In some cases, it may be desirable to bookmark sections of a presentation. Bookmarks can be used to, for example, reference or rapidly move to a section of the recording. However, bookmarks are often manually entered and/or are based on a single participant's input. Further, bookmarks generally do not take into account underlying physical responses from one or more (e.g., an aggregate) of the participants. Accordingly, improved electronic communication methods and systems are desired.

Any discussion of problems provided in this section has been included in this disclosure solely for the purposes of providing a background for the present invention and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems and methods and to non-transient computer readable media suitable (e.g., suitable for implementing the methods and/or for use with the systems). The electronic communication systems and methods can be used in a variety of applications, including video and/or audio conferencing or other forms of electronic communications. Exemplary methods and systems can determine one or more biometric events associated with one or more participants (e.g., active participants and/or audience members) to an electronic communication and annotate a recording of the electronic communication with one or more bookmarks associated with the biometric events and optionally additional information, as set forth in more detail below to form annotated recorded information. The additional information can include, for example, a context of a section of the annotated recorded information, a strength and/or type of biometric event, a number and/or percentage of participants exhibiting one or more (e.g., same or similar) biometric events within a predetermine period of time, or the like.

Systems and devices described herein can provide a more reliable means for, for example, determining an effectiveness of a conferencing event, because exemplary methods and systems monitor the stake-holders (e.g., participants) to see benefits from the information from the biometric data.

Bookmarking to provide tagging of recordings can be based upon keyword detection through NLP analysis, limited sentiment analysis for conversational/situational cues, and through silence detection (i.e., whenever transitions are detected, insert a bookmark). However, such techniques generally do not provide feedback or information based on participant information. As explained in more detail below, examples of the disclosure provide systems and methods to automatically capture participant biometric information and bookmark recording, without compromising participant privacy. For example, if one person is having a hard time staying awake, systems and methods can ignore this event unless it occurs in unison with others or if it is a reaction to stressful content.

Systems and methods described herein can be used for a variety of applications, such as improving presenter skills, improving presentation content, monitoring reactions of audience members during seminars, trade shows, movies, or the like. Further, systems and methods can be used to further monitor health information of participants and send anonymous alerts to participants if an irregularity is detected.

Figure 1:
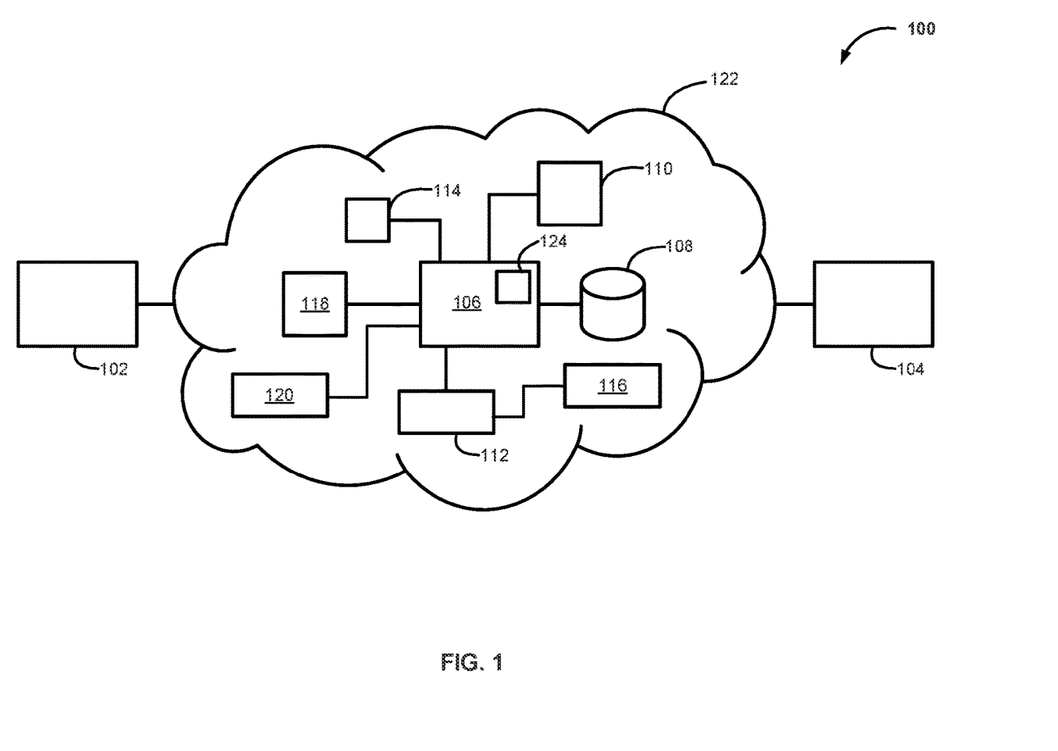
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. For illustration purposes, system 100 is described in the context of a video conference and/or collaboration system. However, unless otherwise noted, systems and methods in accordance with embodiments of the disclosure are not so limited. For example, methods and systems described herein can be used to annotate audio recordings and/or text (e.g., transcribed) information.

Electronic communication system 100 includes one or more devices, such as devices 102 and 104; a network 122; and a communication server 106. In the illustrated example, electronic communication system 100 also includes a database 108, a recorder 110, a biometric determination engine 112, an authentication module 114, a comparison engine 116, a context determination engine 118, and a verification engine 120. Electronic communication system 100 can include other devices, engines, modules, servers, networks, and the like, coupled to communication server 106 and/or network 122. Further, unless otherwise noted, electronic communication systems in accordance with examples of the disclosure need not include all of the illustrated engines, modules, or the like.

Devices 102 and 104 can be or include any suitable device with wired or wireless communication features and that can connect to network 122 and/or communication server 106. For example, one or more of devices 102, 104 can be or include a wearable device, a tablet computer, a wired phone, a mobile phone, a personal (e.g., laptop or desktop) computer, a streaming device, such as a game console or other media streaming device, or the like. One or more of devices 102, 104 can include an application or client to perform various functions set forth herein and/or to cause to be displayed text and/or other information as described herein. By way of example, an application or client can display or play or cause to be displayed or played annotated recorded information as described herein. Additionally or alternatively, one or more devices 102, 104 can be used to collect biometric information as disclosed herein. Although illustrated with only two devices 102, 104, systems in accordance with this disclosure can include one, two, or more devices. In some cases, a single device (e.g., device 102) can be used by multiple participants (e.g., at a common location).

In accordance with examples of the disclosure, at least one device 102, 104 includes a biometric detection device. Exemplary biometric detection devices include cameras, heart rate monitors, blood oxygen level monitors, blood pressure monitors, and the like.

Network 122 can include or be, for example, an internet protocol (IP) network. Exemplary types of networks suitable for communication with network 122 can be or include a local area network, a wide-area network, a metropolitan area network, one or more wireless networks, or a portion of the Internet. Various components of network 122 can be coupled to one or more other components using an Ethernet connection, other wired connections, and/or wireless interfaces. Network 122 can be coupled to other networks and/or to other devices typically coupled to networks. By way of particular example, network 122 includes a communication network and network 122 can be coupled to additional networks that can be coupled to one or more devices, such as device 102, 104. Exemplary additional networks can include a network similar to network 122, a public switched telephone network (PSTN), or the like.

Communication server 106 can be or include any suitable server. Communication server 106 can perform various functions as described herein. For example, communication server 106 can provide electronic communication (e.g., audio, video, text, and/or email) links between device 102 and one or more other devices, such as device 104. In accordance with an example of the disclosure, communication server 106 includes a private branch exchange (PBX) server. In accordance with further examples, communication server 106 is communicatively coupled, either directly or indirectly, to one or more of database 108, recorder 110, biometric determination engine 112, authentication module 114, comparison engine 116, context determination engine 118, and a verification engine 120, in any combination.

In some cases, communication server 106 can include a call routing module 124 and/or authentication module 114. Although separately illustrated, call routing module 124 and authentication module 114 can be combined and/or various functions of one or more of call routing module 124 and authentication module 114 can be separated into one or more additional modules and/or servers. In some cases, authentication module 114 can be used to authenticate participants, moderators, presenters, and the like. Such authentication can be used to allow access to various information and/or system functions as described herein. By way of examples, authentication module 114 can authenticate one or more participants via username and passwords, participant identifiers, authentication codes, or the like.

As used herein, "module" or "engine" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

Call routing module 124 can be used to control call flows to and from communication server 106. Call routing module 124 can be used to allow participants to initially interact with communication server 106 via user interfaces on their respective and/or shared devices.

Database 108 can include one or more devices, such as computers or servers, to store information. By way of examples, database 108 can be or use one or more of Microsoft SQL Server, MySQL, Microsoft Access, Oracle, or the like relational database systems. Further, although illustrated as a single device, database 108 can include and/or be combined with other databases.

Recorder 110 can be or include any suitable module for recording at least a portion of a communication received by communication server 106, such as a communication to or from one or more devices 102 and/or 104. The recorded electronic communication information can include audio, video, and/or text information. In accordance with examples of the disclosure, recorder 110 can be automatically initiated upon initiation of an electronic communication. In this case, recorder 110 can receive a signal from communication server 106 upon initiation of the electronic communication. Further, recorder 110 can, in some cases, transcribe recorded information and/or cause the recorded information to be transcribed.

Biometric determination engine 112 can determine one or more biometric events associated with one or more devices (e.g., device 102 and/or 104). For example, one or more devices (e.g., device 102 and/or 104) can include a client or application to monitor and to transmit biometric information of one or more participants. If one device is used to monitor multiple participants, the biometric information can be aggregated prior to sending the biometric information to server 106. Biometric information can include, for example, eye movement, eyes closing and/or eyes opening, yawning, other facial expression, heart rate, blood pressure, microsleep detection, body movement, blood oxygen level, breathing rate, or the like. Pulse oximetry, or SpO2, for example, is a measurement of oxygen saturation, which can be lead indicators of boredom. Microsleep detection can be used to find people nodding off. Applications or clients on smartphones can be used to detect microsleeping when, for example, the devices are equipped with a dual-camera or more than one camera. Haar-like classifiers (available in an OPENCV Library) can be used to detect eye-opening and closing, which can be used as a basis for identifying sleepy people. Pulse oximetry or oxygen saturation can also be used to identify acute, elevated stress levels or anxiety.

In accordance with examples of the disclosure, biometric determination engine 112 is configurable—e.g., by an administrator—to identify available biometric determination devices that can be used for a communication. For example, in some cases, only a camera on a device may be used. In other cases, only heart rate monitors or the like may be used.

In accordance with examples of the disclosure, biometric determination engine 112 is configured to aggregate biometric information from two or more participants. In accordance with further examples, a biometric event is not based solely on an individual participant's biometric information. In such cases, biometric information for two or more participants within a predetermined timeframe (e.g., overlapping in time or within 2 minutes, 1 minute or 30 seconds) can trigger a biometric event.

Biometric determination engine 112 can include or be coupled to comparison engine 116. Comparison engine 116 can be used to compare individual and/or agglomerated biometric information to determine whether a change in biometric information (e.g., greater than about 5%, 10%, 25%, or 100%) has occurred and/or to compare individual and/or agglomerated biometric information to a predetermined threshold value. For example, agglomerated biometric information for a plurality of participants can be compared on an ongoing basis to determine whether a change in the biometric information for one or two or more participants (e.g., heartrate, blood oxygen level, or the like) has changed by a predetermined amount or above or below a predetermined threshold.

Biometric information, biometric events, and/or predetermined threshold values can be stored within database 108 or elsewhere.

Context determination engine 118 can be used to determine and analyze context(s) of recorded information. To determine the context(s) within recorded information, context determination engine 118 can determine and analyze keywords, such as words, phrases, clauses, and/or topics within the recorded information. Context determination engine 118 can also be configured to store or to cause to be stored associated information, such as the keywords, proposed keywords, context, and/or cues in database 108 and/or another database. Context determination engine 118 can cause a context repository within a database to be created upon receiving notification of a start of a recording.

As used herein, "context" and/or "context information" can be or include keywords as described herein. Additionally or alternatively, "context" and/or "context information" can include information derived from keywords. For example, keywords can be or comprise objects and/or actions as set forth in U.S. Publication No. 2012/0179706 A1, the contents of which are incorporated herein by reference, to the extent such contents do not conflict with the present disclosure. Additional examples of determining and using keywords and context information are provided in U.S. Publication No. 2020/0184018 A1, filed Dec. 11, 2018, in the name of Mitel Networks Corporation, the contents of which are incorporated herein by reference, to the extent such contents do not conflict with the present disclosure.

Keywords can be generated from, for example, corpus of text, which can be derived from a transcription of the electronic communication. For example, keywords can be derived from action words, such as verbs, including the root form (e.g., meeting, doing, developing, building, etc.).

A typical Stanford NLP parser can be used to identify verbs and roots and thus keywords. An exemplary reference can be found at: https://stackoverflow.com/questions/42539073/nlp-extract-the-action-verb-noun-from-a-list-of-instructions. Additionally or alternatively, Count Vectors/Feature Hashing/Tf-idf (see, https://towardsdatascience.com/an-overview-for-text-representations-in-nip 3112537.30af1) and/or word embeddings/training embeddings/contextualized embeddings (see, https://towardsdatascience.com/an-overview-for-text-representations-in-nlp-311253730af1) can be used to identify context within recorded information. Semantic scoring (e.g., scoring words that are based on semantic similarity irrespective of the fact that they are not exact matches—e.g., Natural Language Processing (NLP) technique known as embedding) and/or ranking (see, https://towardsdatascience.com/how-to-rank-text-content-by-semantic-similarity-4d2419a84c32) can be used in the determination of keywords and context.

Action words can be stored in a database. The recorded information can be preprocessed to identify the keywords and determine context. By way of specific examples, the following methodology can be used to derive context.

"Action Word List":
  Standard action words are in the English dictionary. Similar action words (non-standard), "86 last year's stock", and jargon such as "xerox the docs".
  Reference library can be established.

"Preprocessing":
  After the words are scrubbed for stop words, etc., the words can be containerized.

Words are converted to their root form (aka lemmatization); (see: https://nlp.stanford.edu/IR-book/html/htmledition/stemming-and-lemmatization-1.html).

Morphologically words are indexed together.

The morphemes are achieved through lemmatization (or stemming the words) to receive root words. Example: Election→Elect, Elected→Elect.

"Higher Level Representation":

System creates a numerical representation of the pulled words.

Compares numerical representations (how we understand how similar two or more words are to each other).

Dictionary (set) or private lexicon.

These can be abstractions of the refined word/token list (essentially a way for computers to assess words by converting them into numbers).

These are achieved through passing the input text (after preprocessing) into shallow/deep machine learning models.

Performed before semantic analysis.

"Semantic Analyzer":

Simply a way to compare the higher-level representations of the action-word list using the retrieved "transcript" from the remember me/this instances.

Scoring can be used to weight terms that have suitable semantic attributes. By way of example, an encoder component of the semantic analyzer can convert words into integers or strings of integers that can become vectors that are placed into three-dimensional plane apply geometrical principals.

This can be achieved through cosine similarity or Jaccard index, or the like.

In a nutshell: Words with their context are converted into vectors, which are then compared.

See cosine reference: https://www.machinelearningplus.com/nlp/cosine-similarity/#2whatiscosinesimilarityandwhyisitadvantageous Other methods: https://medium.com/@adriensieg/text-similarities-da019229c894

"Mapping and ranking of options" (new step):

This step is for the semantic distinction bestowed to the top phrases with action words or keywords.

For example, two analyzed words are very similar to each other, therefore they represent high candidacy for action statements.

Here, only the scoring is being analyzed (system has to make a decision or else a lack of semantic distinctiveness produces nonsense words in which case action statements are nonsensical).

"Custom Text Parser":

Often, a text parser takes the highly ranked words for actions and merely distills them to something with the same meaning. In accordance with examples of the disclosure, text is parsed—e.g., using n NLP parser program (usually Python based) that determines the grammatical structure of sentences. Its segments the word strings into which groups of words that go together as syntactic phrases ALSO, parsing figures out which words are the subject or object of a verb phrase. Stuff we know, but the machine needs to solve and assemble. An exemplary parser can be found at https://nlp.stanford.edu/software/lex-parser.shtml.

When keyword and/or contact information is obtained and used, system 100 and methods can create topics (based on keywords), then associate the relevant, extracted data in the form of bookmarks or links for later study.

Verification engine 120 can be or include a module to verify whether a participant authorizes monitoring and or use of the participant's biometric information. For example, verification engine 120 can be used to individually poll participants (e.g., all participants) to verify whether or not system 100 can be used to monitor and/or use the respective participants' biometric information to determine biometric events.

Methods in accordance with further examples of the disclosure include the steps of establishing an electronic communication between a communication server and one or more participant devices, recording the communication to form recorded information, using the one or more participant devices, transmitting biometric information for one or more participants of a communication, using the communication server, monitoring the biometric information, using a comparison engine, comparing data corresponding to the biometric information or data corresponding to an aggregation of the biometric information for a plurality of participants to a predetermined threshold to determine whether a biometric event occurs, creating one or more bookmarks in the recorded information for one or more biometric events to form annotated recorded information, and storing the annotated recorded information. The annotated recorded information can include recorded text, audio, and/or video information. Exemplary methods can further include determining a context within the annotated recorded information, and the recorded information can be annotated with indicia of the context. Methods can further include a step of agglomerating biometric information and/or suppressing personal identifying information. Additionally or alternatively, methods can include a step of implementing at least one action in response to the biometric event.

Figure 2:
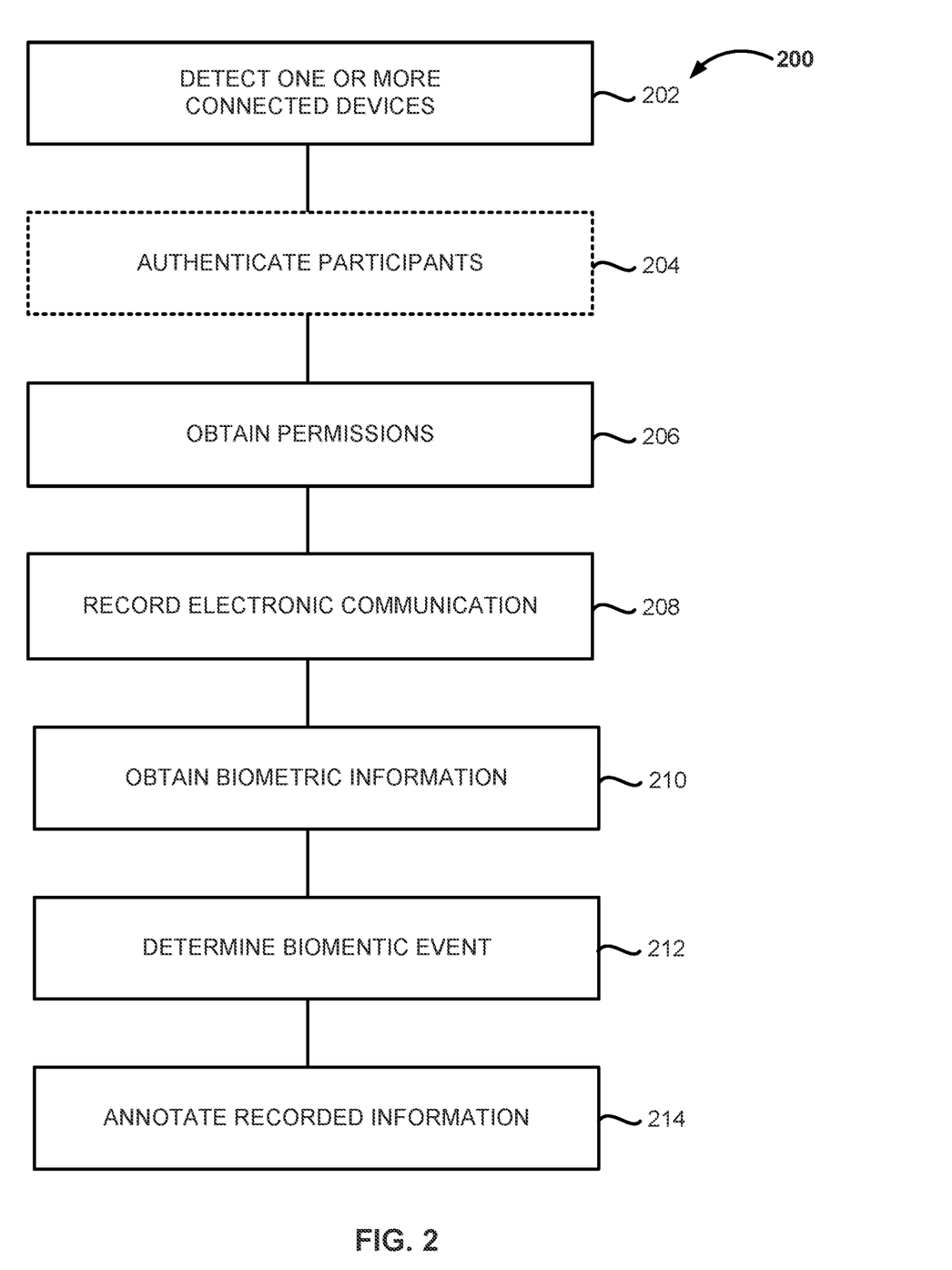
FIG. 2 illustrates a method in accordance with exemplary embodiments of the disclosure in greater detail.

Turning now to FIG. 2, a method 200 in accordance with examples of the disclosure is illustrated. Method 200 includes the steps of detecting one or more connected devices (202); optionally authenticating one or more participants (204), obtaining permission to collect biometric information (206); recording an electronic communication to form recorded information (208), obtaining biometric information from the one or more connected devices (210), determining a biometric event (212); and annotating the recorded information with one or more bookmarks corresponding to the biometric event (214). In accordance with various embodiments of the disclosure, method 200 can be performed using a non-transient computer readable medium containing program instructions for causing a computer to perform the method.

By bookmarking important relevant information that might get missed due to any sort of distraction during the meeting, facilitators/presenters can study how an audience reacted to the content indicated by collective reactions. Additional information on where to insert bookmarks can come from the audience to self-corroborate a physical reaction.

During step 202, method 200 determines whether one or more devices are connected—e.g., to a communication server (e.g., communication server 106), to a network (e.g., network 122), and/or to another device. The determination can be made by, for example, communication server 106, network 122, call routing module 124, or a device, such as device 102 and/or 104.

During step 204, one or more participants can be authenticated. For example one or more—e.g., each—participant can be requested to enter a username and/or password for the conference and/or for an enterprise to participate in method 200.

During step 206, method 200 can obtain permissions from one or more participants to use biometric information—e.g., to determine biometric events—as described herein. During step 206, a user can be presented a query as to whether the participant authorizes use of biometric information. By way of example, a participant can authorize use of biometric information by selecting a radio button. The negotiation to grant permission can be based on a quick acceptance of terms before a user is connected to the communication and/or before recording begins. Data regarding browsing activities, including the exchange of some personal information, can be permitted. For example, a user permission-based approach can be used to prompt a participant to anonymously share data regarding their devices that monitor biometric information for the purposes of improving the delivery of cloud services. For example, the system itself may constitute a new cloud service that users opt into, in which case the confidential data may not be used exclusively in improving the delivery of content through data-driven bookmarking . . . it could be used at any event where aggregate data analysis results in improving the delivery of services. The participant biometric information can be collected using one or more devices, such as devices 102 and 104. Unless otherwise noted, steps need not necessarily be performed in the order illustrated, and one or more steps of one method can be used or interchanged with steps of another method.

Step 208 of recording the communication can begin at any time. For example, the recording can begin once at least one participant device is connected to the communication, once a presenter's device is coupled to the communication, after all permissions are received, or the like. The recording can automatically end when the presenter leaves the communication, when the last participant leaves the communication, or the like.

Once permissions are obtained, method 200 can proceed to step 210 of obtaining biometric information. As noted above, the biometric information can be collected using one or more user devices associated with participants that have granted permission to use biometric information in step 206. In some cases, a calibration step can be performed, where each participant that has granted permission to use biometric information is asked to perform one or more tasks, such as roll eyes, yawn, stand and/or walk, or the like.

During step 212, whether a biometric event has occurred is determined. The determination can be made, for example, using biometric determination engine 112, described above. By way of example, the biometric information can be aggregated, and a determination made as to whether data associated with the aggregated biometric information within a predetermined amount of time exceeds a predetermined threshold.

Once a biometric event is determined, the recording can be annotated. For example, the recording can be annotated with an indicia of the biometric event, indicia of a context of the recording (e.g., coinciding with the biometric event) and/or indicia of strength of a biometric event. In the case of annotating with a context, the method can further include a step of determining a context coinciding a section of the recording as described herein.

Once the annotated recorded information is created, bookmarks can be used to pinpoint useful context when reviewing playback of a recorded event. When watching, reaching, and/or listening to the recorded information, a presenter or other participant can review the annotated recorded information to improve the content or delivery of the information.

Method 200 or other methods described herein can additionally include other capabilities, such as user-directed bookmarking, NLP bookmarking, camera-based detections, and the like.

Figure 3:
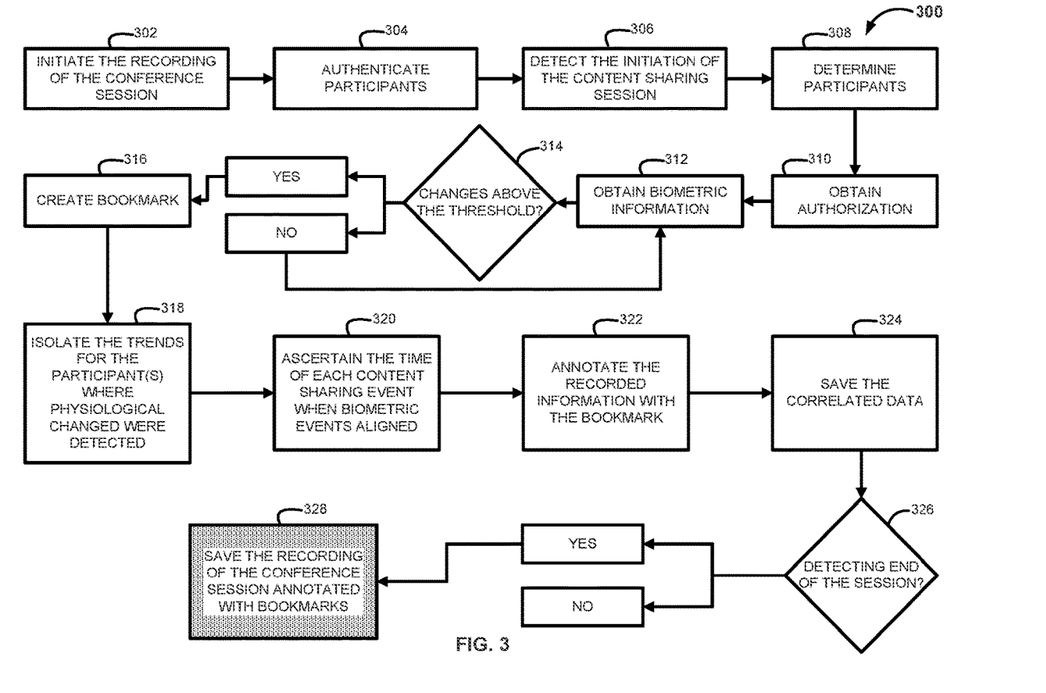
FIG. 3 illustrates another method in accordance with exemplary embodiments of the disclosure.

FIG. 3 illustrates another method 300 in accordance with examples of the disclosure. Method 300 can be the same or similar to method 200 and/or can be performed using system 100. As illustrated, method 300 can be performed as a cloud service. In this case, the biometric information can be collected and analyzed using a separate data collection service, which can be separate from the communication server. Further, the recording service can be a separate microservice. The bookmarking service could also be separate.

As illustrated, method 300 includes the steps of initiating a recording (302), authenticating participants (304), detecting initiation of content sharing (306), determining participants (308), obtaining participant authorizations (310), obtaining biometric information (312), determining whether a change in the biometric information is above a predetermined threshold (314), creating a bookmark (316), isolating trends for participants (318), ascertaining a time and/or location within a recording of a (e.g., each) biometric event (320), annotating the recorded information (322), saving the annotated recorded information (324), determining whether communication has ended (326), and saving or storing the annotated recorded information (328).

During step 302, a recording of a conference session (e.g., started during step 202 and/or created using system 100) begins. The recording can begin automatically (e.g., upon establishing an electronic communication between a communication server and one or more participant devices) or can be started manually by one or more participants (e.g., a presenter) selecting to record the electronic communication.

Step 304 can be the same or similar to step 203 described above.

During step 306, method 300 detects an initiation of content sharing. Step 306 can include, for example, detecting when one or more participants (e.g., a presenter) begins to speak, when an image is shared to one or more participants, when a presenter manually selects a beginning of a communication, or the like.

During step 308, one or more participants are determined. Participants can be determined by, for example, having one or more participants log in or otherwise self identify. In some cases, voice recognition can be used to determine the participants. In some cases, step 308 can additionally include determining one or more presenters from among the participants.

Step 310 can be the same or similar to step 206. Additionally or alternatively, method 300 can use voice recognition to determine one or more participants during step 308.

Step 312 can be the same or similar to step 210. During step 312, biometric information (e.g., agglomerated, calibrated, and/or the like) can be compared to a threshold value to determine whether a biometric event occurred.

If a biometric event occurred, a bookmark can be created during step 316. If no biometric event occurred, method 300 can go back to step 312.

During step 318, method 300 determines whether the biometric event occurred for only one or more than one or more than a threshold number or percentage (e.g., greater than 10, 25, 50, 66, or 75%) of participants—e.g., within a predetermined amount of time—e.g., within 1, 2, 3, 5, or 10 minutes. If the biometric event occurs for only one participant—e.g., during the predetermined amount of time, the participant may be asked to verify the biometric event and/or the single-participant biometric event may be ignored.

During step 320, a time or place within the recorded information corresponding to a biometric event(s) is/are determined—e.g., for biometric events of step 318. That is, once a threshold number of biometric events are determined to occur within the predetermined time period, the recorded information can be annotated with each biometric event or a representation of a plurality of biometric events. The one or more biometric events can be grouped all together, grouped by type—e.g., eye roll, yawn, other facial expression, heart rate increase or decrease, or the like. The recorded information can be annotated with indicia of the one or more biometric events during step 322 and the recorded information stored during step 324. In some cases, the annotation can further include an indication of context and/or a strength of the biometric event. A strength of a biometric event can be determined by, for example, a number of participants experiencing a biometric event (e.g., the same or similar biometric event and/or in the same indication level—e.g., lowered pulse/heart rate and/or yawning) and/or a change in magnitude of the biometric event. For example, a change greater than a predetermined magnitude, such as 20, 50, or 75%, can be illustrated (e.g., with a different color or the like) differently than a change in magnitude of the biometric event that is less than such predetermined threshold.

During step 326, a determination of whether the electronic communication terminated is made. An electronic communication can be terminated manually by one or more participants or automatically—e.g., when a predetermined amount of silence is determined and/or by one or more participants (e.g., the presenter) saying a key term, such as "goodbye" or the like.

Finally, during step 328, the annotated recording is stored. The annotated recording can be stored in, for example, database 108 or other suitable database.

Figure 4:
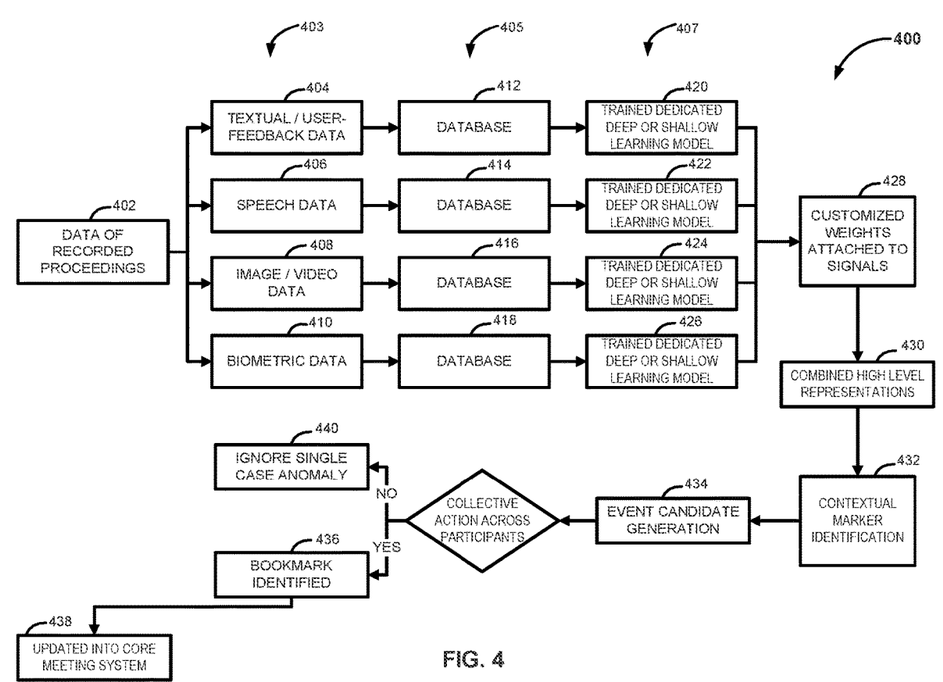
FIG. 4 illustrates another method in accordance with exemplary embodiments of the disclosure.

FIG. 4 illustrates another method 400 in accordance with examples of the disclosure. Method 400 includes a machine-learning subprocess that can be used to add context information (e.g., determined as described herein) to the recorded or annotated recorded information.

In the illustrated example, recorded information 402 can include textual/user feedback data 404, speech or audio information 406, image or video information 408, and biometric information 410, or any combination of biometric information with other information. The respective information can be parsed at step 403 stored in one or more databases 412-418 during step 405. In some cases, at least the biometric information is stored separately from the other information.

One or more dedicated machine learning modules 420-426 can be used to determine statistically significant events during step 407. For example, machine learning module 420 can be used to identify textual user information to be used to annotate a recording. Machine learning module 422 can be used to identify speech information (e.g. from the presenter or one or more participants) to be used to annotate a recording. Machine learning module 424 can be used to identify image and/or video information to be used to annotate a recording. Machine learning module 426 can be used to identify biometric information (e.g., using techniques as described herein) to be used to annotate a recording.

Customized weights can be attached to the output of one or more modules 420-426 during step 428. Detected information to be annotated (e.g., higher or lower than a threshold) can be combined during step 430. Contextual marker information can be added at step 432.

An event candidate can be generated at step 434, bookmarks identified at step 436 and the recorded information and/or previously-annotated recorded information can be updated during step 438. During step 440, single biometric event information and/or biometric event information relating to a number of participants below a threshold can be ignored.

Figure 5:
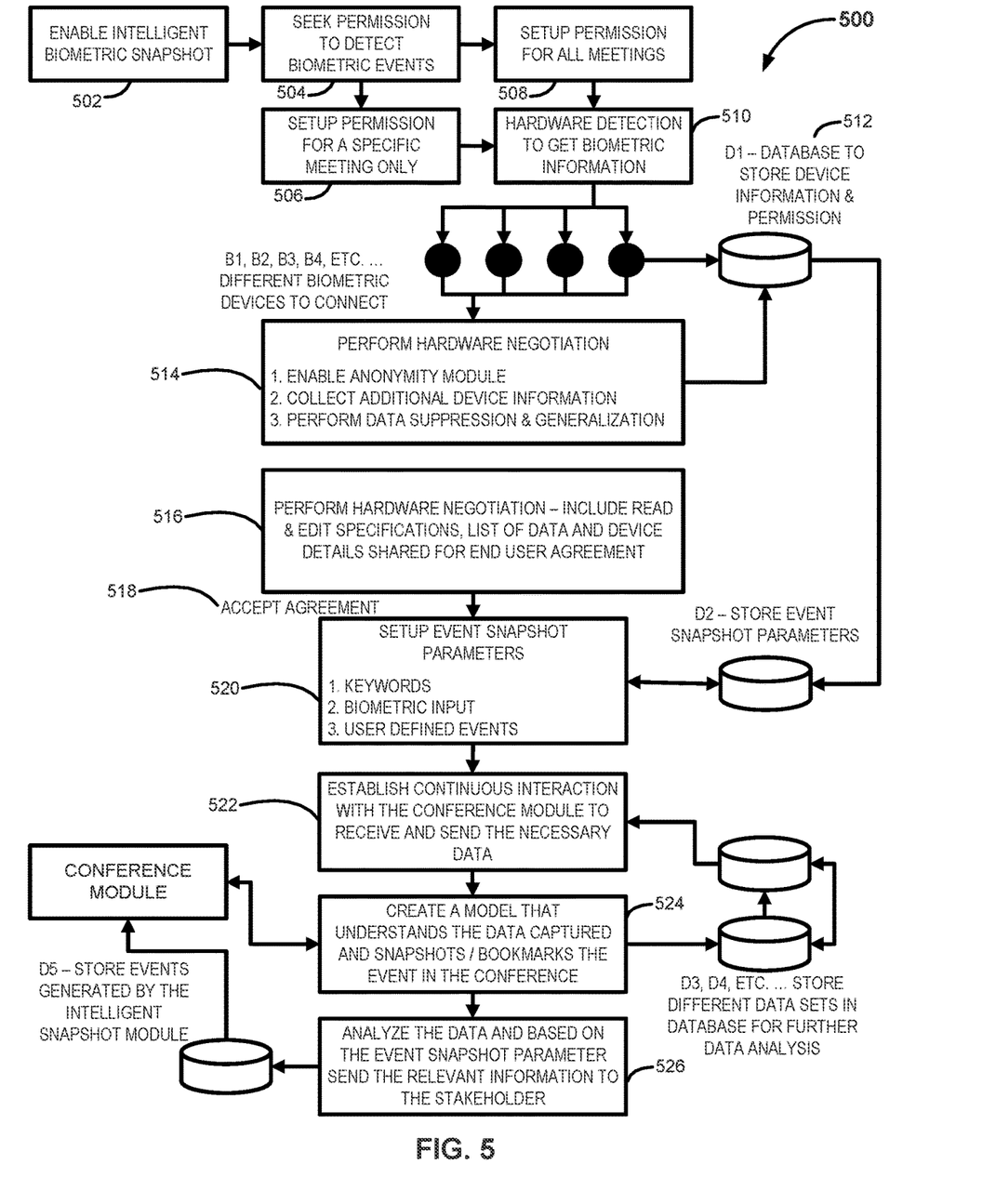
FIG. 5 illustrates yet another method in accordance with further exemplary embodiments of the disclosure.

FIG. 5 illustrates a device permission and detection subprocess suitable for use in accordance with examples of the disclosure. At step 502, subprocess 500 is initiated. During step 504, permission from one or more participants is sought—e.g., as described above. Permissions can be set up for a specific communication (506) or for a plurality of communications (508).

During step 510, subprocess 500 can detect devices coupled to a communication that can provide biometric information. The device and permission information can be stored in one or more databases (D1) (step 512).

During step 514, hardware negotiations—e.g., with a communication server, can be performed. During this step, substeps of enabling an anonymity module, collecting additional device information, and performing data suppression and generalization can be performed. The resulting information can be stored in one or more databases.

During step 516, additional hardware negotiations, such as reading and editing of specifications and listing of data and device details, are shared for end user agreements.

At step 518, one or more user devices can be used to accept the end user agreement.

At step 520, event snapshot parameters, such as keyword, biometric information input, and user defined events are set up. The event snapshot parameters can be stored in one or more databases (D2).

During step 522, a connection between a biometric detection engine or module and a communication server can be established and maintained during the communication.

During step 524, a conference module can be generated. The conference module can receive information captured and/or manipulated (e.g., to remove identifying information) during step 520 and/or other steps of method 500. Information generated during step 522 and/or step 524 can be stored in one or more databases (D3, D4).

During step 526, the data or information can be analyzed—e.g., based on the event snapshot parameters, and relevant information can be sent to a stakeholder, such as one or more participants, the presenter, or another. Data generated during step 526 can be stored in database (D5) and provided to the conference module created in step 524.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. It will be recognized that changes and modifications may be made to the exemplary embodiments without departing from the scope of the present invention. These and other changes or modifications are intended to be included within the scope of the present invention, as expressed in the following claims.

The invention claimed is:

1. An electronic communication method, the method comprising the steps of:

utilizing an electronic communication system to initiate a conference;

establishing an electronic communication between a communication server, the conference, and one or more participant devices, wherein the one or more participant devices are in communication with the conference via the communication server and each of the one or more participant devices is associated with a unique conference participant;

using the one or more participant devices during the conference, to transmit to the communication server biometric information for the unique conference participant associated with each of the one or more participant devices, wherein the communication server records the conference and the biometric information to create recorded information;

using a biometric determination engine to aggregate the biometric information of a plurality of unique conference participants to create aggregated biometric information;

using a comparison engine, comparing the aggregated biometric information to a predetermined threshold to determine whether a biometric event occurred;

if a biometric event occurred, creating a bookmark in the recorded information for each biometric event to form annotated recorded information;

storing the annotated recorded information, and analyzing the annotated recorded information to identify one or more bookmarks and a conference content and biometric event associated with each of the one or more bookmarks, and providing the analysis to a conference participant or a conference presenter.

2. The electronic communication method of claim 1, wherein the annotated recorded information comprises recorded audio information.

3. The electronic communication method of claim 2, wherein the annotated recorded information comprises recorded video information.

4. The electronic communication method of claim 1, further comprising a step of utilizing a context determination engine to determine a context within the annotated recorded information, wherein the context is determined by analyzing keywords within the annotated recorded information.

5. The electronic communication method of claim 4, wherein the annotated recorded information is further annotated by the determination engine with the keywords.

6. The electronic communication method of claim 1, wherein the biometric information cannot trigger a biometric event unless a predetermined number of conference participants demonstrate the same biometric information within a predetermined amount of time.

7. The electronic communication method of claim 6, wherein the biometric information includes any conference participant's use of a device other than the one or more participant devices.

8. The electronic communication method of claim 1, further comprising a step of suppressing personal identifying information.

9. The electronic communication method of claim 1, further comprising a step of further annotating the annotated recorded information with an indicia of the type of biometric event.

10. The electronic communication method of claim 1, further comprising a step of authenticating a biometric event with at least one of the conference participants.

11. The electronic communication method of claim 9, further comprising a step of determining whether a plurality of conference participants created generated the same biometric information within a predetermined amount of time.

12. The electronic communication method of claim 1, further comprising a step of adding an indicator of strength associated with the biometric event to the annotated recorded information.

13. The electronic communication method of claim 1, wherein a single participant device is configured to monitor the biometric information of a plurality of participants.

14. An electronic communication system configured to generate an electronic conference, wherein the electronic communication system comprises:

a communication server for communicating with the conference and with one or more participant devices, wherein the one or more participant devices are in communication with the conference via the communication server and each of the one or more participant devices is associated with a conference participant;

a database coupled to the communication server, the database configured to receive biometric information from the communication server during the conference, wherein the biometric information corresponds to each one of the conference participants;

a recorder to record the conference and the biometric information to create recorded information;

a biometric determination engine configured to aggregate the biometric information of a plurality of the conference participants to create aggregated biometric information;

a comparison engine for determining whether the aggregated biometric information exceeds a predetermined threshold to determine whether a biometric event occurred; and the electronic communication system creating one or more bookmarks in the recorded information for each biometric event to form annotated recorded information.

15. The electronic communication system of claim 14, further comprising an authentication module.

16. The electronic communication system of claim 14, further comprising a context determination engine.

17. The electronic communication system of claim 14, further comprising a verification engine.

18. A non-transitory computer readable medium containing program instructions for causing a computer to perform a method of annotating recorded information with one or more bookmarks associated with a biometric event during a conference that includes a conference host and conference participants, wherein the method comprises the steps of:

detecting one or more conference participant devices, wherein each conference participant device is associated with one of the conference participants and is in communication with the conference;

obtaining permission from a plurality of the conference participants to collect biometric information for each of the plurality of conference participants;

obtaining biometric information from the participant device of each of the plurality of conference participants;

recording the conference and the collected biometric information to form recorded information;

using a biometric determination engine to aggregate the biometric information of the plurality of the conference participants to create aggregated biometric information;

determining whether a biometric event has occurred by utilizing a comparison engine to determine whether the aggregated biometric information exceeds a predetermined threshold; and annotating the recorded information with one or more bookmarks corresponding to the biometric event in order to create annotated recorded information.

19. The non-transitory computer readable medium of claim 18, wherein the program instructions further cause the computer to:

analyze keywords in the annotated recorded information to determine a context within the annotated recorded information; and further annotate the recorded information with an indicia of the context.

20. The non-transitory computer readable medium of claim 18, wherein the program instructions further cause the computer to aggregate the biometric information of each conference participant and determine whether the aggregated biometric information within a predetermined amount of time exceeds a predetermined threshold that causes the aggregated biometric information to be designated as a biometric event, and if a biometric event has occurred, bookmarking the biometric event in the annotated recorded information.

* * * * *